Jan. 10, 1928.
M. H. SQUIRES
SNUBBER
Filed Nov. 26, 1926
1,655,776
2 Sheets-Sheet 1
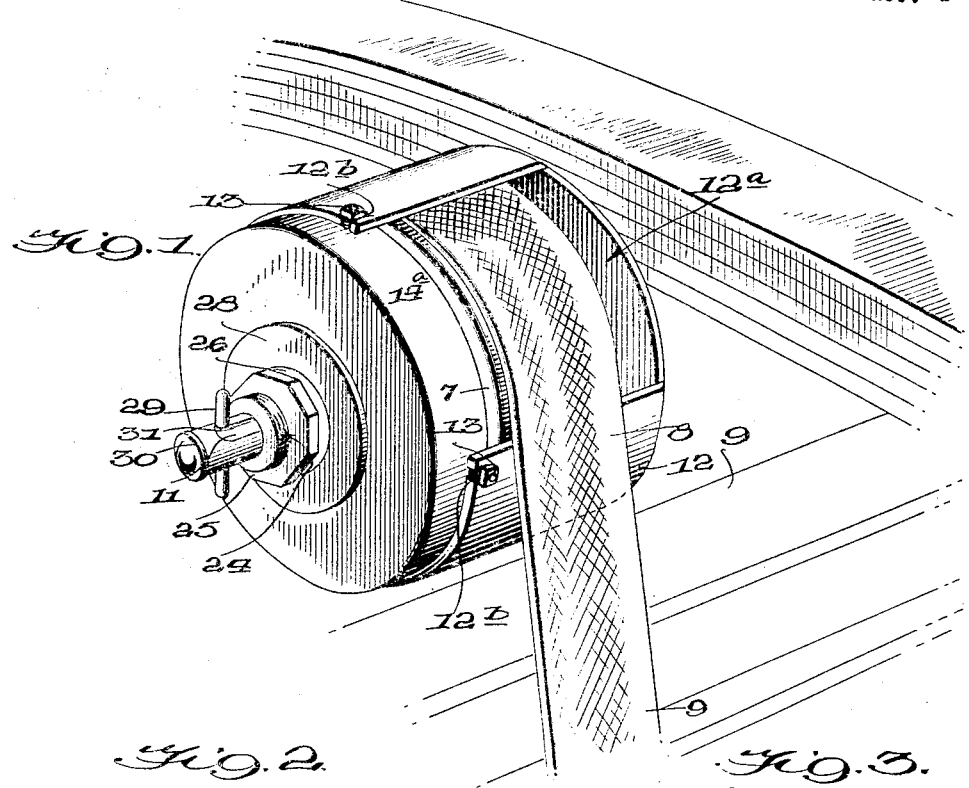
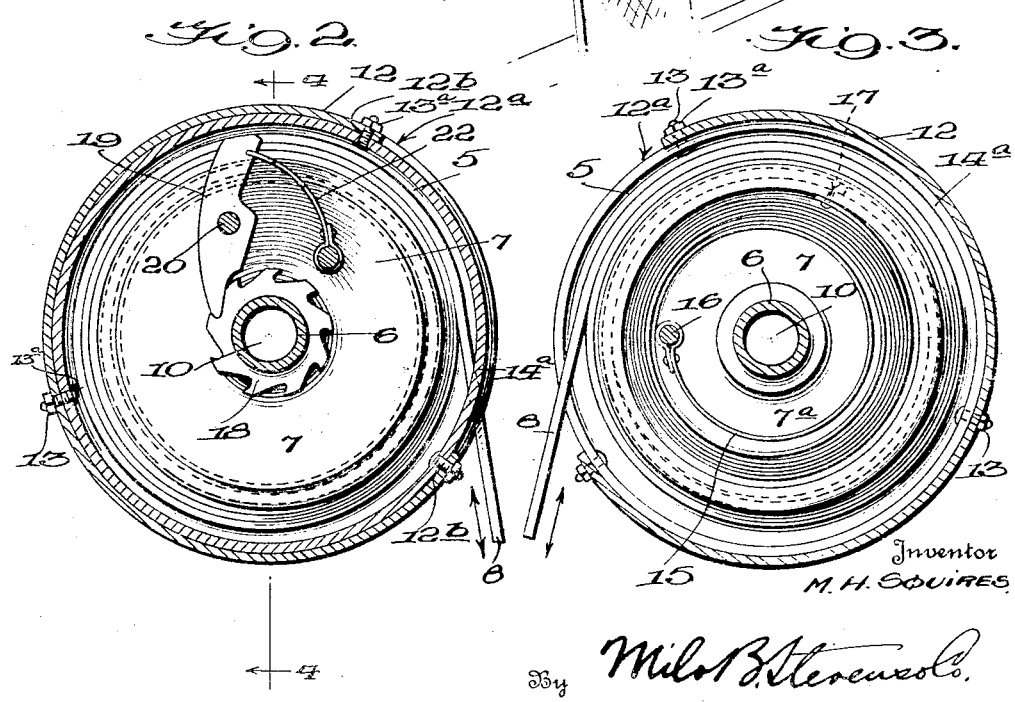
Inventor
M. H. SQUIRES
By Milo B. Stevens Co.
Attorneys

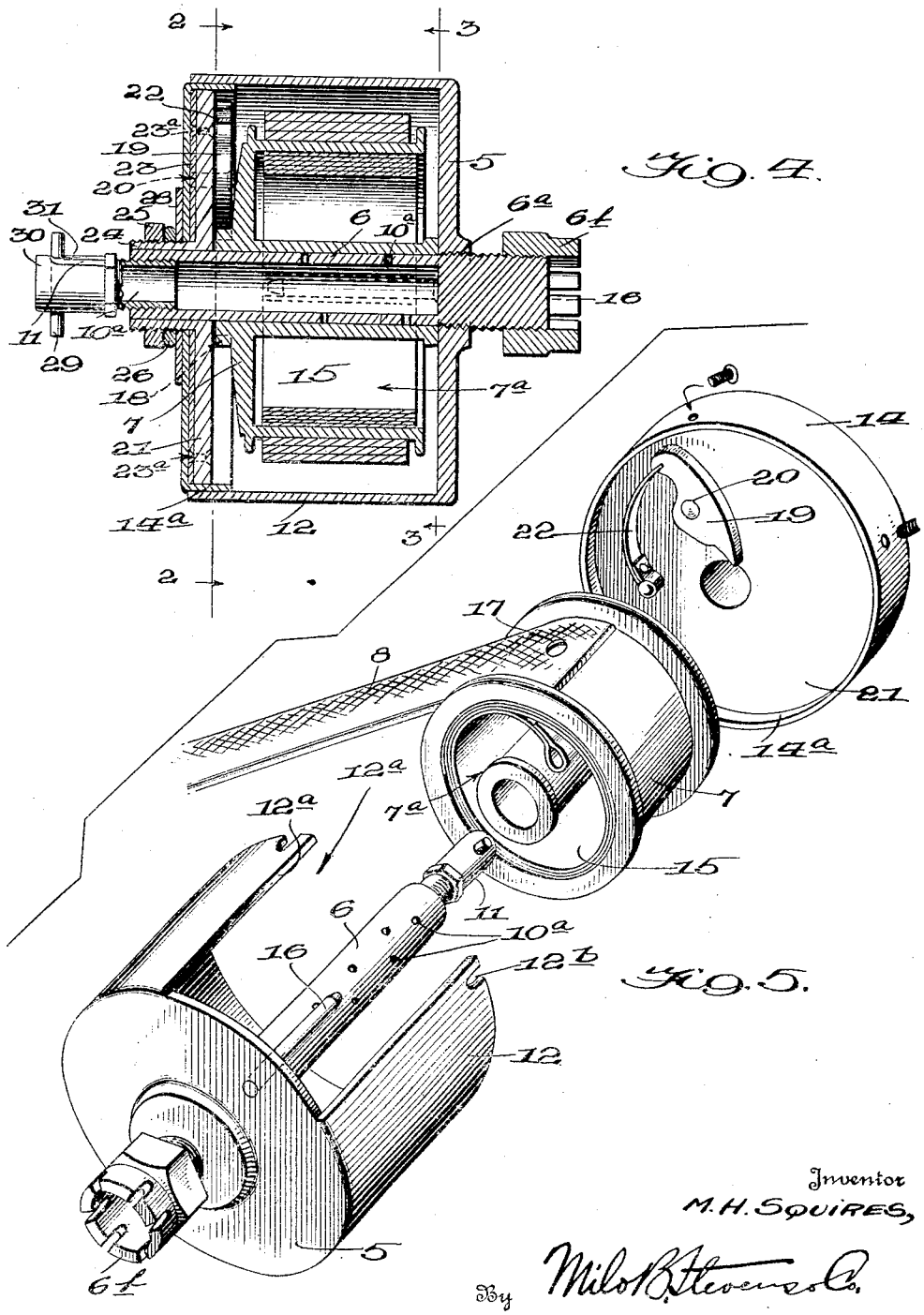

Patented Jan. 10, 1928.

1,655,776

UNITED STATES PATENT OFFICE.

MERWYN H. SQUIRES, OF SOUTH MANCHESTER, CONNECTICUT.

SNUBBER.

Application filed November 26, 1926. Serial No. 150,976.

My invention relates to shock absorbers of the so called "snubber" type and is particularly designed for use in connection with motor vehicles to prevent the sudden recoil of the body supporting springs after they have been compressed.

Briefly stated, one of the important objects of the invention is to provide in a device of this character a novel means for frictionally resisting the rebound of the vehicle body; one which involves a minimum number of parts which can be readily inspected or adjusted to reduce or increase the frictional resistance without necessitating the removal of the device from the vehicle; and which can be readily applied to all types of cars.

Another object of the invention is the provision of a highly simplified and relatively inexpensive device of this kind which will be relatively small in size without sacrificing either durability or efficiency.

The foregoing and other objects of the invention, which will become apparent as the description proceeds,—are attained by means of a novel combination and arrangement of parts to be hereinafter described and claimed, and in order that the same may be better understood, reference should be had to the accompanying drawings forming a part of this specification. The drawings illustrate the now preferred embodiment of the invention, but it is to be understood that various changes and modifications may be made therein without departing from the spirit and scope of the invention as claimed hereinafter.

In the drawings,

Figure 1 is a perspective view showing the device associated with a motor vehicle the chassis frame to which the device is attached being deleted for the sake of clearness.

Figure 2 is a cross section on the line 2—2 of Figure 4;

Figure 3 is a cross section on the line 3—3 of Figure 4;

Figure 4 is a section on the line 4—4 of Figure 2; and,

Figure 5 is a group perspective view of the various parts in disassembled relationship.

Referring specifically to the drawings, wherein the same reference characters designate the same parts in all views, numeral 5 denotes the disk-like plate, or base member of the device. Through the center of base 5 a hole is bored and tapped to receive the threaded end $6^a$ of a shaft 6, the major portion of which is smooth to provide a bearing for the rotatable drum 7 upon which is wound the flexible connection 8, the free end of which is designed to be fastened to the vehicle axle 9 or other part of the running gear.

The threaded end $6^a$ of the shaft 6 extends through, and a substantial distance beyond, the base member 5 being designed to be inserted through a drilled hole in the chassis frame whereby the device may be mounted thereon and so held by means of a nut $6^b$. The shaft 6 is provided with a longitudinal bore 10 extending inwardly from its other end and terminating at the beginning of the threaded part $6^a$. The bore 10 has its outer end tapped to receive a conventional grease gun nipple 11 and is also provided intermediate its ends with a plurality of transverse ports $10^a$ communicating through the shaft whereby lubricant entering through nipple 11 may reach the bearing of drum 7.

To the disk-like base member 5 is welded a substantially cylindrical member 12 overhanging the drum 7 and having a portion of its wall cut away as at $12^a$ to form an opening through which the flexible connection 8 passes. The outer edge of the cylindrical member 12 is cut with a plurality of notches $12^b$ to receive the radially extending fastening bolts 13 of the inturned circumferential flange $14^a$ of the disk-like closure member 14, the latter with the base member 5 and the member 12 completing the housing of the device. The flange $14^a$, as clearly shown in the drawings, is designed to be confined within the end of the member 12. Nuts $13^a$ clamp the closure 14 in place. It is of course to be understood that parts 5 and 12 may be integrally formed if desired.

Referring again to the drum 7,—the end adjacent the base member 5 is cut with an annular recess $7^a$ for a strong flat coil spring 15. The inner end of the coil spring 15 is looped and receives a fixed post 16 extending from base 5, while the outer end of the spring is fastened to the drum 7 by the small bolt and nut 17 which also secures the flexible connection 8. It is obvious from the showing in the drawings that a pull on the connection 8 will rotate the drum 7 against the tension of the spring 15; also that the drum will be rotated by its spring 15 to take up any slack in connection 8 that occurs when the vehicle springs are compressed.

The opposite end of the drum 7 has its projecting hub part cut with ratchet teeth 18 designed to be engaged by a dog 19 pivoted at 20 to the adjacent face of a cast metal disk 21 rotatably carried within the closure 14. A leaf spring 22 carried by disk 21 engages dog 19 to hold it in cooperative engagement with drum ratchet 18.

To the other face of disk 21 is riveted or otherwise secured, as denoted at 23ª, an annular facing 23 of asbestos or other friction material which may be of the kind commonly used for brake bands. The disk 21 has a fixed, centrally positioned sleeve 24 which projects through a relatively larger hole in the closure 14 and has its outer end threaded to receive a lock nut 25,—between which and the outer surface of the closure 14 is interposed a spring washer 26 and a broad washer 28 which latter abuts the closure.

From the foregoing it will be understood that disk 21 will be rotated through ratchet 18 and dog 19 when the connection 8 is pulled outwardly against the action of spring 15. The engagement of the friction facing of disk 21 with the inner face of closure 14 resists turning of drum 7 to unwind connection 8 and the tightness of this frictional engagement can be varied by tightening or loosening nut 25 on the fixedly carried sleeve 24 of disk 21. Dog 19 rides idly over ratchet 18 when drum 7 reverses to reel in connection 8.

The shaft 6 extends into the sleeve 24 which constitutes the outer bearing or support therefor. The periphery of disk 21 engages and is supported by the circumferential flange 14ª of the closure 14 as clearly shown in the drawings. The grease gun nipple 11 projects a substantial distance beyond the outer end of the sleeve 24 and its removable, transversely extending pin 29 engages the end of the sleeve to cooperate with the elements 13, 13ª in holding the closure 14 in place.

From the foregoing description, taken in connection with the accompanying drawings, it will be obvious that when the vehicle springs compress the slack thus created in connection 8 will be immediately reeled in by the spring actuated drum 7,—the dog 19 riding idly over the ratchet 19 as aforesaid. Then, when the vehicle springs recoil or rebound to draw connection 8 outwardly, such action will be rendered gradual by the frictional resistance created by the contact between the friction facing 23 and the adjacent face of the closure 14, which, acting through the dog 19 and ratchet 18 retard the unreeling movement of drum 7.

In the construction described the bearing of drum 7 will be efficiently lubricated through ducts 10ª of bore 10 of shaft 6 on application of a grease gun to nipple 11. All parts are enclosed and protected by the casing 5, 12, 14. When it is desired to inspect the working parts of the device the base 5 need not be detached from the vehicle, as closure 14 can be readily removed by simply pulling out pin 29 and loosening nuts 13ª. Also, replacement of friction surface 23 of disk 21 can be accomplished by simply taking nut 25 off of disk sleeve 24 and pressing the sleeve inwardly to disengage the disk 21 from the flange 14ª of closure 14.

It is pointed out that shaft 6 in addition to being threadedly secured to base 5 is preferably welded or otherwise permanently secured thereto, although its threaded engagement therewith is ordinarily satisfactory.

A closure cap 30 is removably held upon grease gun nipple 11 by a bayonet slot connection 31 with the ends of pin 29.

Having thus described my invention, what I claim as new and desire to secure by Letters Patent is:—

1. A shock absorber comprising a housing open at one end, and having means for attachment to a support, a flexible connection extending into said housing, a spring actuated winding drum to which said connection is attached, a closure for the open end of said housing and having an inturned flange designed to engage inside the walls of said housing, a disk rotatable within said closure and inside of its flange, a ratchet gear formed upon one end of said drum, a dog carried by said disk and designed to engage said ratchet when said flexible connection is being drawn from said housing to thereby effect the rotation of said disk with said drum, a projection carried by said disk and extending through said closure, and means associated with said projection for bringing the proximate faces of the disk and closure into intimate contact.

2. A shock absorber comprising a housing open at one end and having means for attachment to a support, a flexible connection extending from said housing, a spring actuated winding drum journalled within said housing to which said flexible connection is attached, a closure for the open end of said housing, a ratchet gear formed on one end of said drum, a disk removably and rotatably mounted upon the inner surface of said closure and co-axial with said drum, a dog carried by said disk and operatively engaging the teeth of said ratchet whereby said disk will be rotated when the drum is turned in a direction contra to the action of said spring, and clamp means for effecting an intimate frictional engagement between said disk and the inner surface of said closure.

3. A shock absorber comprising a housing having a base member at one end and open at the other end, a medial shaft rigidly carried by and extending through said base member into said housing and having a threaded portion projecting from the outer face of said base member to constitute a means for attaching the device to a support, a flexible connection extending into said housing, a spring actuated winding drum journalled upon said shaft and to which said connection is attached, a removable closure for the open end of said housing, fastening means therefor, a ratchet gear formed upon one end of said drum, a rotatable disk having a medial bearing journalled upon the end of said shaft, said closure having means engaging and supporting said disk whereby to brace and support the free end of said shaft, said disk bearing having an outwardly projecting threaded portion extending through an opening in said closure, a nut threaded upon the outwardly projecting portion of said disk bearing and adapted to bind the contiguous surfaces of said disk and closure into intimate frictional contact, and a dog carried by said disk and engaging said ratchet gear to operatively connect said drum and disk when the flexible connection is pulled outwardly against the action of the drum spring.

4. A shock absorber comprising a housing having a base member at one end and open at the other end, a medial shaft rigidly carried by and extending through said base member into said housing and having a threaded portion projecting from the outer face of said base member to constitute a means for attaching the device to a support, a flexible connection extending into said housing, a spring actuated winding drum journalled upon said shaft and to which said connection is attached, the end of said shaft within said housing having a longitudinal bore extending a substantial distance in the direction of said threaded end, said bore having transverse ducts communicating through said shaft whereby lubricant within said bore may be supplied to the bearing of said drum, a removable closure for the open end of said housing, a ratchet gear formed upon one end of said drum, a rotatable disk having a medial bearing journalled upon the end of said shaft, said closure having means engaging and supporting said disk whereby to support and brace the free end of said shaft, said disk bearing having an outwardly projecting threaded portion extending through an opening in said closure, a nut threaded upon the outwardly projecting portion of said disk bearing and adapted to bind the contiguous surfaces of said disk and closure into intimate frictional contact, a friction facing detachably carried by one of said surfaces, a dog carried by said disk and engaging said ratchet gear to operatively connect said drum and disk when the flexible connection is pulled outwardly against the action of said drum spring, a grease gun engaging nipple connected in the bore of said shaft and projecting through the extension of said disk bearing and beyond the outer end thereof, and said nipple having a removable cross pin engaging the end of said disk bearing extension whereby to removably hold said closure in place and the disk in a position wherein its dog will play over said drum-carried ratchet gear.

5. A shock absorber comprising a housing open at one end and having means for attachment to a support, a connector having one end designed for engagement to a second support, a swingingly mounted member within said housing and having connection with said connector, yielding means acting through said connector and normally tending to draw said supports together, a closure for said housing, a rotatable member carried by said closure and engaging the inner surface thereof, clamp means associated with said closure and rotatable member for varying the intimacy of the frictional contact between the contiguous surfaces thereof and moving said rotatable member away from said swingingly mounted member, and means for operatively connecting said disk with said swingingly mounted member when the latter moves in a direction to permit the increasing of the distance between said supports whereby to frictionally retard such movement.

6. A shock absorber comprising a housing open at one end and having means for attachment to a support, a shaft having one end rigidly supported within said housing, a connector having one end designed for engagement with a second support, a member pivoted on said shaft and operatively connected to said connector, yielding means acting through said connector and normally tending to draw said supports together, a closure for said housing and rigidly mountable thereon and having a bearing for the outer end of said shaft for supporting the latter, a rotatable member removably carried by said closure and engageable with the inner surface thereof, said rotatable member being journalled upon said shaft, clamp means associated with said closure and disk for varying the intimacy of the frictional contact between the contiguous surfaces thereof and drawing the disk away from said pivoted member, and means for operatively connecting said disk with said pivoted member when the latter is moved in a direction to permit the distance between said supports to be increased whereby to retard such movement.

7. A shock absorber comprising a housing having means at one end for attachment to a support and provided with a side opening, a flexible connection entering said housing through said side opening, a spring actuated winding drum to which said connection is attached, a disk rotatable within said housing at one end thereof, a ratchet gear formed upon one end of said drum, a dog carried by said disk and designed to engage said ratchet when said flexible connection is drawn from said housing to thereby effect the rotation of said disk with said drum, a projection carried by said disk and extending through the adjacent end of said housing, and means associated with said projection for bringing the proximate faces of the disk and housing end into intimate contact.

8. A shock absorber comprising a housing having means at one end for attachment to a support, a flexible connection extending from said housing, a spring actuated winding drum journalled within said housing to which said flexible connection is attached, a ratchet gear formed on one end of said drum, a disk removably and rotatably mounted within said housing and adjacent one end thereof, said disk being co-axial with said drum, a dog carried by said disk and operatively engaging the teeth of said ratchet whereby said disk will be rotated when the drum is turned in a direction contra to the action of said spring, and clamp means for effecting an intimate frictional engagement between said disk and the adjacent surface of said housing end.

9. A shock absorber comprising a cylindrical housing having means at one end for attachment to a support and provided with a side opening, a flexible connection entering said housing through said side opening, a spring actuated winding drum to which said connection is attached, a disk rotatable within said housing at one end thereof, a ratchet gear formed upon one end of said drum, a dog carried by said disk and designed to engage said ratchet when said flexible connection is drawn from said housing to thereby effect the rotation of said disk with said drum, a projection carried by said disk and extending through the adjacent end of said housing, means associated with said projection for bringing the proximate faces of the disk and housing ends into intimate contact, a shaft upon which said drum and disk are journalled, said shaft extending through and beyond the end of said disk extension and having a longitudinal lubricant bore and side ports leading therefrom, a grease gun nipple threaded in the outer end of said shaft bore, said nipple having a transverse pin extending therethrough, and a closure carried by said nipple and secured by said cross pin.

In testimony whereof I affix my signature.

MERWYN H. SQUIRES.